J. O. HAGUE.
VEHICLE SPRING.
APPLICATION FILED SEPT. 8, 1913.
1,135,577.
Patented Apr. 13, 1915
2 SHEETS—SHEET 1.
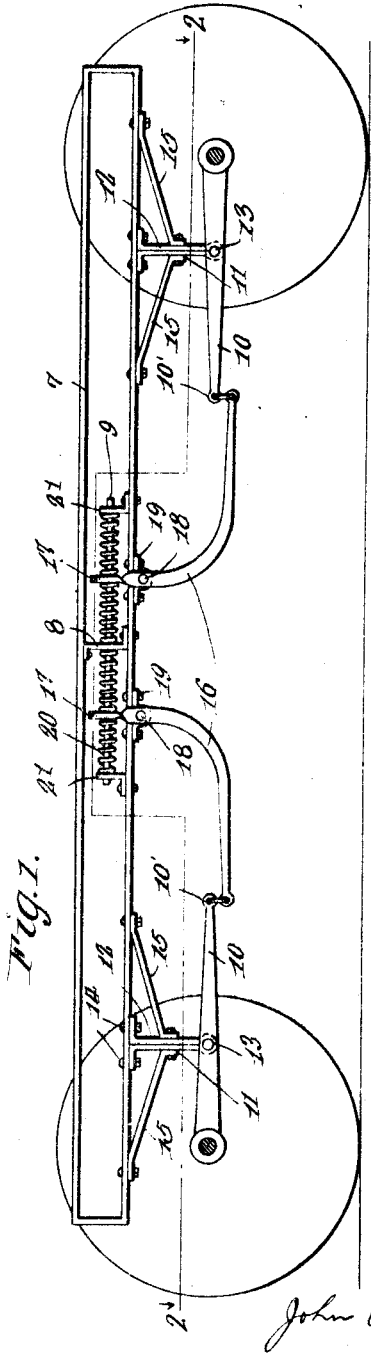
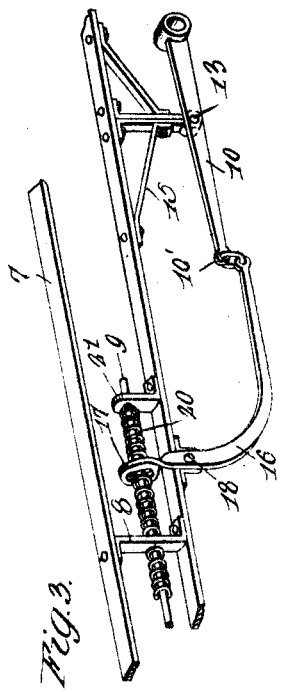
Witnesses
G. M. Spring.
B. J. [signature]
Inventor
John O. Hague,
By Richard [signature]
his Attorney

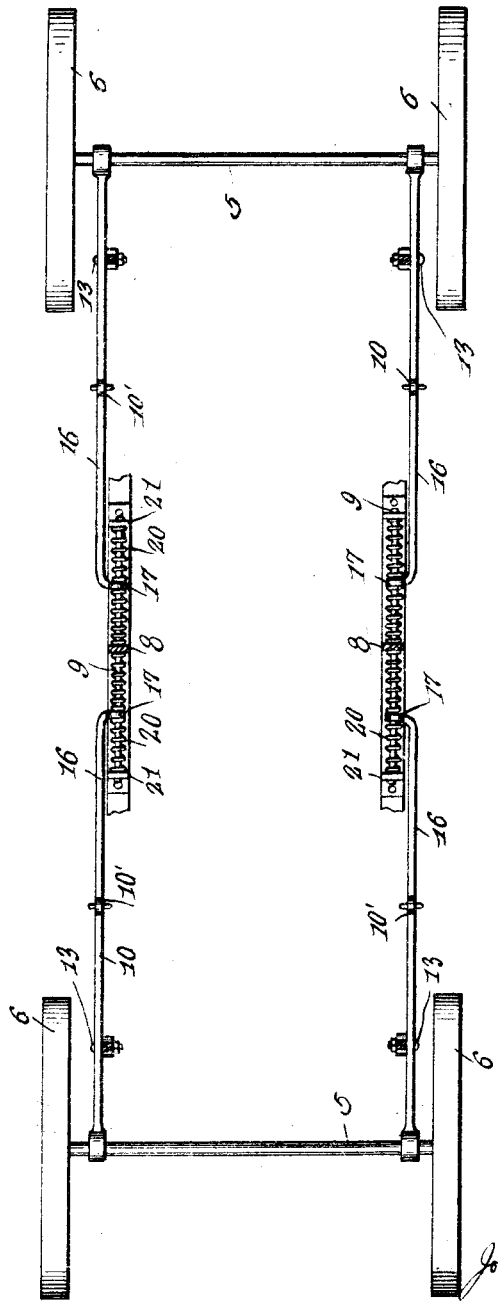

UNITED STATES PATENT OFFICE.

JOHN O. HAGUE, OF BROOKSTON, INDIANA.

VEHICLE-SPRING.

1,135,577.   Specification of Letters Patent.   Patented Apr. 13, 1915.

Application filed September 8, 1913.   Serial No. 788,578.

*To all whom it may concern:*

Be it known that I, JOHN O. HAGUE, a citizen of the United States, residing at Brookston, in the county of White and State of Indiana, have invented certain new and useful Improvements in Vehicle-Springs, of which the following is a specification.

This invention relates to vehicle springs having for its primary object to associate with the vehicle chassis elastic elements which are in connection with the axles of the vehicle for absorbing the shock common to road vehicles due to inequalities or the like.

Another object of this invention is to provide an efficient device of this character comprising but a few and simple parts which may be readily associated thereby reducing the cost of manufacture in devices of this character to a minimum and eliminating the use of the pneumatic tire which although of a highly resilient character nevertheless has been found troublesome in view of the fact that the same is readily incapacitated due to road obstructions and likewise in view of its expensive nature.

Other objects as well as the nature, characteristic features and scope of my invention will be more readily understood from the following description taken in connection with the accompanying drawings and pointed out in the claim forming a part of this specification.

Referring to the drawings:—Figure 1 is a longitudinal sectional view of the device constructed in accordance with my invention; Fig. 2 is a sectional view taken on the line 2—2 of Fig. 1; and Fig. 3 is a detail fragmentary perspective view of a portion of one of the shock absorbing elements.

In the drawings wherein is illustrated the preferred embodiment of this invention in order to properly illustrate the application of the same, a pair of axles 5 are provided the opposite ends of which are in engagement with wheels 6 which may be of the ordinary or any desired form.

In carrying my invention into practice a pair of oblong frames 7 have been provided which are adapted for engagement with the wagon box or bed, each of the frames having mounted between the longitudinal portions thereof, and approximately midway the ends a Z brace 8 which has an aperture formed therein adapted for engagement with the midway portion of an elongated rod 9. Connecting the oblong frame 7 to the axles 5, are a plurality of levers 10 the one end of each of which is in connection with the extreme ends of the axles while the opposite end of each is provided with an eye 10' the function of which will be more fully hereinafter described. Arranged on each of the levers 10, about equi-distant the ends thereof is a brace 11 which comprises a metallic strap 12 the midway portion of which is depressed and engaged with a pivot pin 13, while the opposite ends of the strap are turned upwardly into parallelism with each other, the extreme ends of each being bent outwardly at right-angles to the body thereof and engaged with the lowermost portion of each of the frames 7 through the medium of bolts 14 or other suitable fastening means. Straps 15 are provided the one end of each of which is in engagement with the lower portion of the frame 7 while the opposite end of each is in connection with the straps 12 so as to brace the frame.

Engaged with each of the eyes 10' of the levers 10, are a plurality of arcuate bars 16 the opposite ends of each from that which is connected with the eye 10' being enlarged and provided with a slot 17 which is slidably engaged over the rod 9, being pivoted adjacent its enlarged end on a pin 18 which is carried by a looped-strap 19 on the lower portion of the frame 7. Each of the elongated rods 9 has encircled thereon a pair of coil springs 20 one end of each of which is in engagement with an angle-iron 21 and the opposite end in engagement with the brace 8. The enlarged ends of the arcuate bars 16 heretofore described are arranged adjacent the angle-irons 21. The angle-irons 21 are provided with apertures through which are engaged the extreme ends of the rod 9, and are secured thereto in any suitable manner.

In operation, when one of the wheels 6 strike a road obstruction, the levers 10 will be actuated in a vertical plane causing the arcuate bars which are connected thereto to be swung on the rod 9 in view of the fact that the same are pivoted as at 18 as above pointed out, and are provided with enlarged slotted ends which allow a certain amount of play on the rod and causing the spring 20 which contacts with the enlarged ends of said arcuate bars to absorb the shock as will be obvious when the bars 16 are actuated. It is of course understood that the Z brace which is arranged between each of the oblong frames 7 limits the movement of the spring 20 in an inward direction while the angle-irons 21 limit the movement in a reverse direction.

It will be understood that the above description and accompanying drawings comprehend only the general and preferred embodiment of my invention and that various minor changes in details of construction, proportion and arrangement of the parts may be made within the scope of the appended claim and without sacrificing any of the advantages of my invention.

Having thus fully described my invention what I claim as new and desire to secure by Letters Patent is:—

A shock absorber for vehicles, in combination with a pair of oblong frames, a spring encircled rod carried by each of said frames, a plurality of arcuate bars each of which is pivotally mounted in the frame one end of each of which is provided with an enlarged slot adapted for sliding engagement with said elongated rods, a plurality of levers the one end of each of which is connected to said axle, the opposite end of each having connection with said arcuate levers and braces securing said oblong frames to said second mentioned levers for the purpose set forth.

In testimony whereof I affix my signature in presence of two witnesses.

JOHN O. HAGUE.

Witnesses:
J. W. COMPTA,
H. E. McCULLY.